(12) United States Patent
Sugumaran et al.

(10) Patent No.: US 10,165,725 B2
(45) Date of Patent: Jan. 1, 2019

(54) CONTROLLING GROUND ENGAGING ELEMENTS BASED ON IMAGES

(71) Applicant: Deere & Company, Moline, IL (US)

(72) Inventors: Ramanathan Sugumaran, Bettendorf, IA (US); Noel W. Anderson, Fargo, ND (US)

(73) Assignee: Deere & Company, Moline, IL (US)

(*) Notice: Subject to any disclaimer, the term of this patent is extended or adjusted under 35 U.S.C. 154(b) by 147 days.

(21) Appl. No.: 15/281,867

(22) Filed: Sep. 30, 2016

(65) Prior Publication Data
US 2018/0092295 A1 Apr. 5, 2018

(51) Int. Cl.
*A01C 21/00* (2006.01)
*G05D 1/02* (2006.01)
*A01C 14/00* (2006.01)
*G01C 21/36* (2006.01)
(Continued)

(52) U.S. Cl.
CPC ............ *A01C 21/005* (2013.01); *A01C 14/00* (2013.01); *A01C 23/007* (2013.01); *G01C 21/3676* (2013.01); *G05D 1/0214* (2013.01); *G05D 1/0219* (2013.01); *G05D 1/0246* (2013.01); *G05D 1/0274* (2013.01); *G05D 1/0276* (2013.01); *B64C 39/024* (2013.01);
(Continued)

(58) Field of Classification Search
CPC ..... A01C 21/005; A01C 23/007; A01C 14/00; G05D 1/0276; G05D 1/0219; G05D 1/0246; G01C 21/3676; B64C 2201/127; B64C 39/024; B64C 2201/122
See application file for complete search history.

(56) References Cited

U.S. PATENT DOCUMENTS

| 3,752,915 A * | 8/1973 | Parker ..................... G01J 5/007 348/144 |
| 8,195,342 B2 | 6/2012 | Anderson |
| 8,224,500 B2 | 7/2012 | Anderson |
(Continued)

FOREIGN PATENT DOCUMENTS

| CN | 104848893 A | 8/2015 |
| EP | 0821296 A2 | 1/1998 |
(Continued)

OTHER PUBLICATIONS

German Search Report dated Aug. 29, 2017, from German Patent Application 102017215087.4, 10 pages.

*Primary Examiner* — Frederick M Brushaber
(74) *Attorney, Agent, or Firm* — Joseph R. Kelly; Kelly, Holt & Christenson, PLLC

(57) ABSTRACT

An agricultural machine has a communication component configured to receive a first data set and a second data set. The first and second data sets comprise indications of a soil parameter of a worksite. The first data set is captured at an earlier time than the second data set. The agricultural machine also has a controller configured to receive the first and second data sets and, based on the first and second data sets, generate a map of the worksite. The agricultural machine also has a controllable subsystem configured to receive a control signal from the controller. The control signal is generated based on both a position of the agricultural machine within the worksite and the generated map. The control signal is configured to control operator of the controllable subsystem.

18 Claims, 12 Drawing Sheets

(51) Int. Cl.
*A01C 23/00* (2006.01)
*B64C 39/02* (2006.01)

(52) U.S. Cl.
CPC .. *B64C 2201/122* (2013.01); *B64C 2201/127* (2013.01); *G05D 2201/0201* (2013.01)

(56) References Cited

U.S. PATENT DOCUMENTS

| | | | |
|---|---|---|---|
| 8,560,145 B2 | 10/2013 | Anderson | |
| 2005/0034437 A1* | 2/2005 | McMurtry | A01D 34/008 56/1 |
| 2008/0230205 A1* | 9/2008 | Seguin | F24D 11/002 165/45 |
| 2009/0112475 A1* | 4/2009 | Christy | A01B 79/005 702/5 |
| 2011/0106451 A1* | 5/2011 | Christy | G01N 21/359 702/5 |
| 2011/0295423 A1 | 5/2011 | Anderson | |
| 2014/0303854 A1 | 10/2014 | Zielke | |
| 2015/0106434 A1 | 4/2015 | Fiene et al. | |
| 2015/0359185 A1* | 12/2015 | Guy | A01G 25/09 239/11 |
| 2018/0075760 A1* | 3/2018 | Thompson | H02J 50/20 |
| 2018/0092295 A1* | 4/2018 | Sugumaran | G05D 1/0214 |
| 2018/0114062 A1* | 4/2018 | Barrier | G06K 9/00651 |

FOREIGN PATENT DOCUMENTS

| | | |
|---|---|---|
| EP | 143784 B1 | 2/2007 |
| EP | 3097754 A1 | 11/2016 |

* cited by examiner

CONTROLLING GROUND ENGAGING ELEMENTS BASED ON IMAGES

FIELD OF THE DESCRIPTION

The present description relates to mobile vehicles. More specifically, the present description relates to the sensing of soil moisture or other soil parameters and adjusting vehicle operation based on the sensed parameter.

BACKGROUND

Soil moisture can affect many operations, such as agricultural operations, construction operations, forestry and turf operations, among others. Soil moisture can be strongly affected by snow accumulation.

In many areas, farmers rely on snow accumulation over the winter months as an important source of soil moisture for planting. The moisture content of soil is affected based on the amount of snow that has accumulated, where the snow has accumulated, and how much of the snow melts into the ground and how much is lost to evaporation. Soil moisture content can change the timing of when seeds should be planted, and at what depth the seeds should be placed, among other things. The discussion above is merely provided for general background information and is not intended to be used as an aid in determining the scope of the claimed subject matter.

SUMMARY

An agricultural machine has a communication component configured to receive a first data set and a second data set. The first and second data sets comprise indications of a soil parameter of a worksite. The first data set is captured at an earlier time than the second data set. The agricultural machine also has a controller configured to receive the first and second data sets and, based on the first and second data sets, generate a map of the worksite. The agricultural machine also has a controllable subsystem configured to receive a control signal from the controller. The control signal is generated based on both a position of the agricultural machine within the worksite and the generated map. The control signal is configured to control operator of the controllable subsystem.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
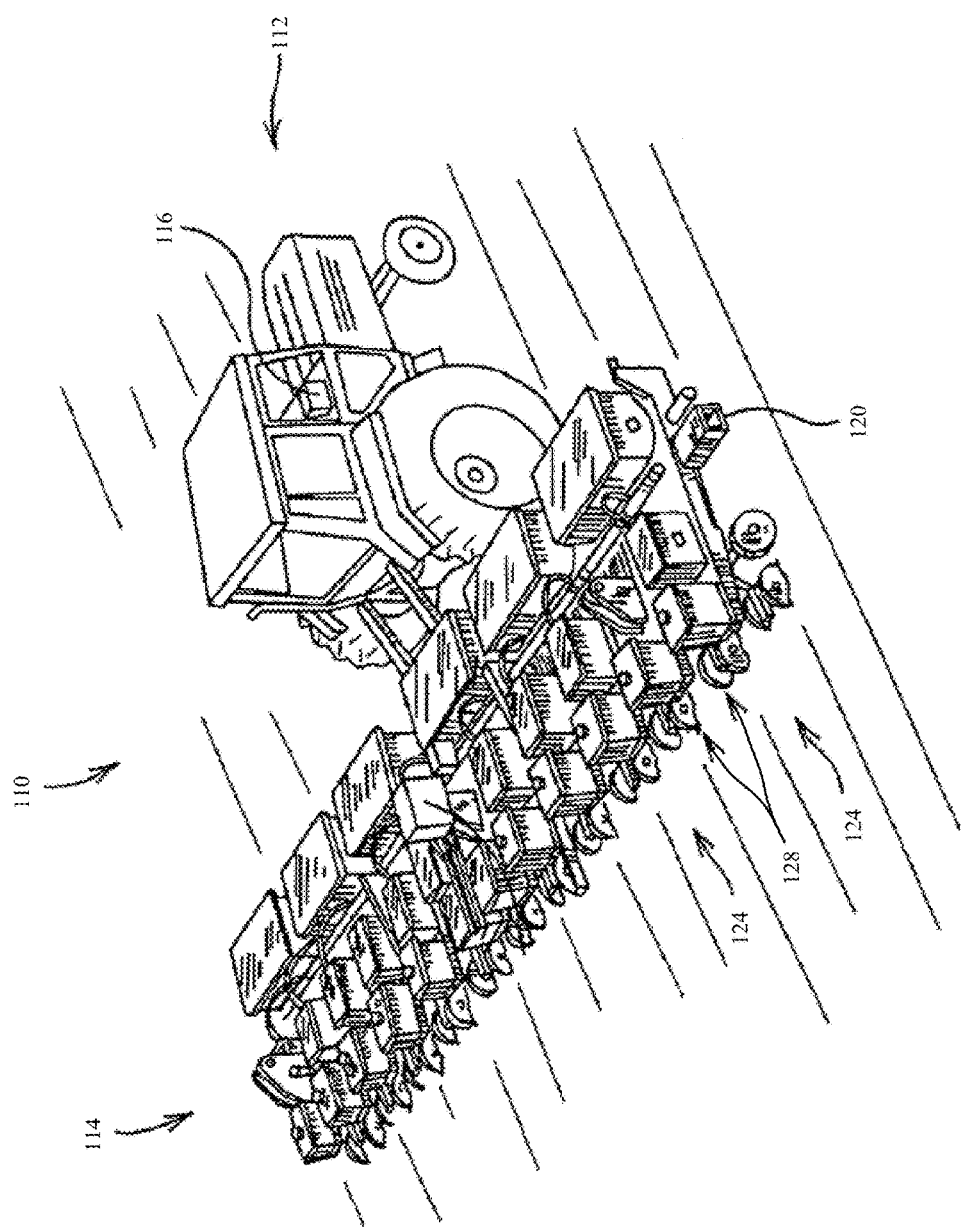
FIG. 1 is one example of an agricultural machine.

Before describing the examples discussed herein, a brief discussion of some considerations in performing operations with a mobile machine will first be provided. The considerations can be factors in many different types of operations, such as agricultural operations, construction operations, forestry and turf operations, etc. They are primarily described herein in the context of an agricultural operation, but this is by way of example only. The discussion could just as easily be applied to other types of operations as well.

One consideration used in planting a field is ensuring that seeds are timely planted. Timing a seed planting operation benefits from considering different factors, for example trafficability (the ability to drive a machine) over the field, temperature and moisture content of the soil, and the genetics of the seed to be planted—for example, a cold tolerance of the strain being planted. Weather forecasts are also a consideration for an upcoming planting operation. For example, it can take up to two days for a seed to germinate, and 5-7 days for emergence. Therefore, a farmer can benefit from having a number of current and forecasted parameters relating to a given field when planning a planting schedule.

Soil moisture content can also be considered in setting parameters for ground engaging implements, such as a planting machine. For example, a planting machine is configured to deposit seeds at a certain depth. The depth can be selected based on a moisture content of the soil. Drier soil, for instance, can be tilled and planted at a different depth than wet soil. Additionally, if the soil is too wet, an agricultural machine might not be able to traverse the field without risk of getting stuck, or causing damage to the vehicle or the planted seeds.

Some soil parameters can be obtained by capturing an image of the soil. The image, for example, can capture soil temperature information for a worksite, or soil moisture information, or snow depth information (which can be used to estimate soil moisture), or soil residue cover information, or any other relevant soil parameter that can be derived from image data. Further, multiple images can be obtained at different points in time, such that a soil parameter, and how it changes over time, is detectable. Knowing how a soil parameter varies across a field can allow for dynamic adjustment of a ground engaging element as the element travels across a field. For example, knowing how soil moisture changes across a field can allow for adjusting a planter seeding depth as it moves across the field.

Further, taking into account variability in soil moisture across a field can improve uniformity across a field for an entire field operation, producing more consistent plant size, among other things.

Such information can also assist in the efficient application of pesticide or other chemicals. Thus, at least some examples described herein can also apply to controlling chemical application to a field. The amount of chemical needed can vary across a field, depending, at least in part, on soil parameters that can be measured or derived from image data. For instance, thermal inertia and snow cover data for a given field can be used to determine how much chemical to apply to fertilize the field or to control pests or weeds. These factors impact the population of a variety of different life forms. Knowing a life form population allows for automatic adjustment of a chemical application rate to meet the needs of different parts of the field. This can provide cost savings by avoiding over-application of pesticide in areas where cold temperatures have killed eggs, larvae, etc. Additionally, it can also allow for adjusting early season nutrient rates, for example, based on the progress of residue decomposition, to ensure that yield is not limited by immobilized nutrients.

Topography of the worksite (e.g., farmland) is another consideration in performing operations with a mobile machine. Topography can generally be known by a farmer. While land does shift or erode over time, it generally remains consistent from one season to the next. However, farmland is often not completely flat. Some fields have at least a partial incline, or some rolling hills or other features throughout. Additionally, snow does not accumulate or melt evenly during the winter months, and the moisture from at least some snow evaporates, rather than melting into the ground. Further, in the northern hemisphere, south-facing fields generally experience warmer temperatures than north-facing fields. Because snow melt can be a key source of moisture for many areas, it can be helpful for a farmer to understand how much snow has accumulated, where the snow has accumulated, and therefore, how the snow is affecting the soil moisture. This can be used to influence a wide variety of different decisions such as when the land is dry enough to begin planting.

Some examples of different implementations will now be described. FIG. 1 is one example of an agricultural system 110. Agricultural system 110 includes a tractor 112 and row crop planter 114. Planter 114 could also be a grain drill, a chemical applicator, or any other suitable agricultural vehicle. Tractor 112 provides the mode of propulsion power for planter 114 and at least some of its controllable subsystems.

In one example, planter 114 includes a toolbar 120, and row units 124. Each row unit 124 can include a metering device or a metering device can be located elsewhere. Seed, in one example, is supplied to the metering device and then planted at a rate determined by the metering device, and at a depth determined by the down force applied to an opener on the row unit.

Figure 2A:
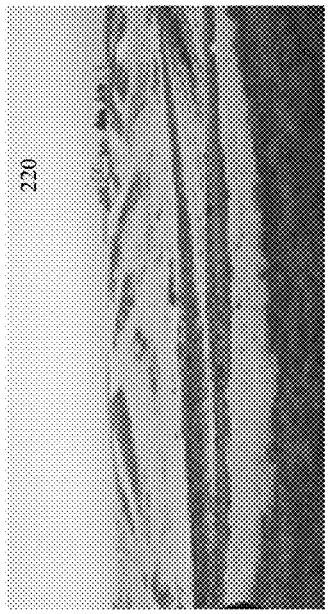
FIGS. 2A-2E show an example of snow de-accumulation from a field with a known topography.

FIGS. 2A-2E illustrate images of a field taken over a time period showing the change in snow cover for a field, as it relates to different topographical areas of the field. In this example, the images are taken at daily intervals, in order to show the rate of snow de-accumulation. As shown in FIG. 2A (the first image taken) snow has accumulated at different depths throughout a field, for example due to drifting, melting, evaporation, etc. It can be seen in FIG. 2A that at least some areas of the field currently have no snow accumulation. However, other areas of the field have experienced some snow drifting (which can occur based on field topography, wind, vegetation, etc.), which can indicate that the associated soil in those areas will accumulate more moisture as the snow melts than the soil in areas with less, or no snow cover.

Snow melt rates can also be affected by topology, wind, and vegetation, with shaded and protected areas melting more slowly than those directly facing the sun (e.g., south-facing slopes of hills). If depth variation patterns are fairly consistent over a number of years, the expected snow cover (depth and/or duration) data can be used to control the amount of residue removed from fields after harvest. In areas with higher than expected snow depth or longer duration, more residue can be removed than in other areas, because lingering snow cover and the resultant lower soil temperature can reduce the amount and/or timing of residue decomposition. This impacts the plant-available nitrogen for the coming year's crop. Also, the snow melt information can be important for a farmer to know which areas of his field are dry enough and warm enough for planting.

Figure 2B:
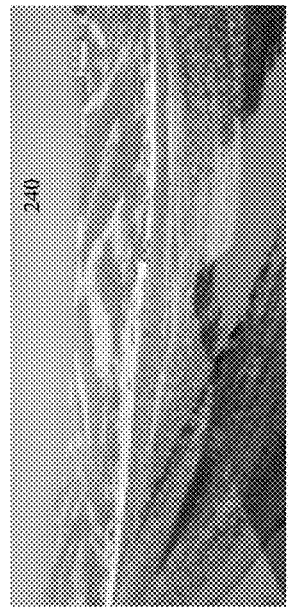
Figure 2C:
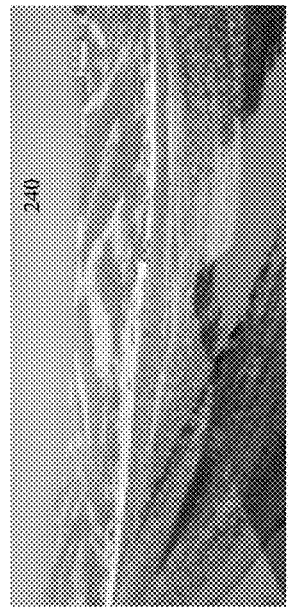
Figure 2D:
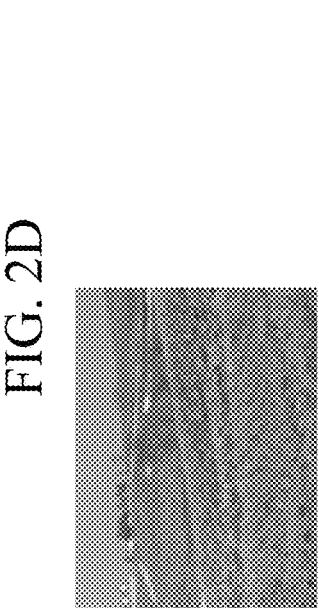
Figure 2E:
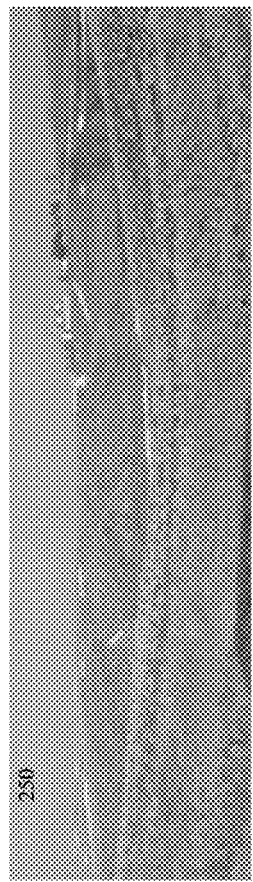

FIG. 2B illustrates another image taken a day later than that shown in FIG. 2A where some snow has either melted or evaporated from the field. FIGS. 2C and 2D illustrate later images showing further snow de-accumulation within the field. In FIG. 2E, almost all of the snow has melted or evaporated off the field. However, knowing that snow was recently on the field, as shown in FIGS. 2A-2D, can give some indication that it might not yet be time to plant the entire field, because some areas of the field might not be dry enough yet to support an agricultural vehicle. Further, some areas of the field might not yet be warm enough for seed planting.

Snow also provides insulation against soil heat loss in cold weather, thus moderating extremes in temperature. Areas with lower snow cover will likely have greater frost depth. Winter temperatures can affect residue decay rates as well as pest survival rates. For example, temperatures below 18.5° F. kill root worm eggs. Therefore, simply having visual confirmation that snow is cleared from a field (for example, the contrast between FIGS. 2A and 2E, without knowing snow depth) may not give enough information to know whether it is time to plant, which areas of the field have received enough moisture, and which areas would benefit from additional pesticide and/or fertilizer before, during or after planting.

In one example, a farmer can augment his or her knowledge about the field (for example previous planting habits and the harvest results from the previous season) with additional data sets that are collected and are indicative of varying soil parameters across the entire field. One example method for collecting field data is the use of an unmanned aerial vehicle (UAV). A UAV can be helpful to collect field data with respect to snow depth, snow coverage and melting, soil moisture, and soil temperature, etc.

Figure 3:
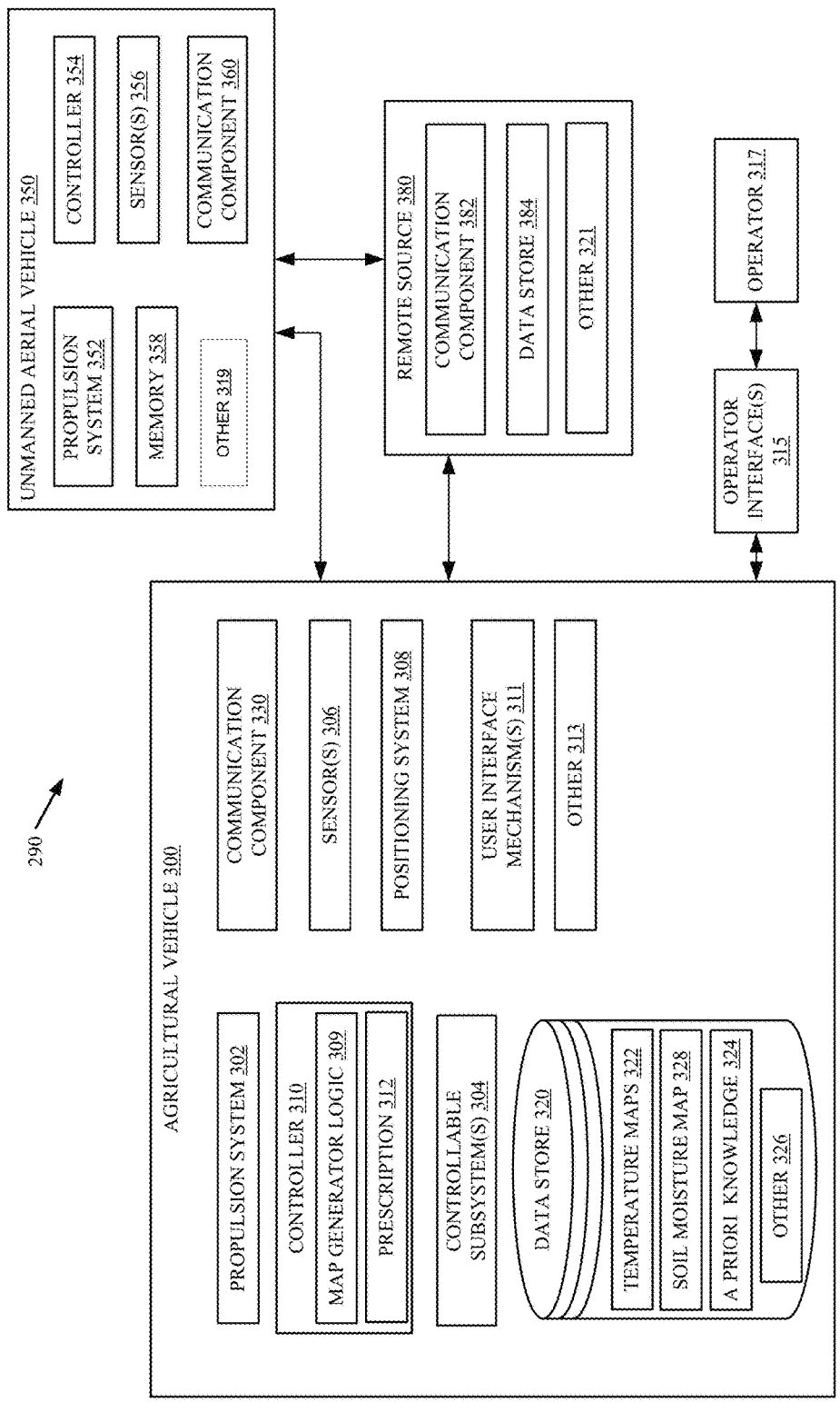
FIG. 3 is a block diagram of one example of an agricultural system.

FIG. 3 is a block diagram of one example of an agricultural system 290. Agricultural system 290 includes an agricultural vehicle 300, a UAV 350 and a remote system/source 380, in one example. FIG. 3 also shows that vehicle 300 can generate operator interface(s) 315 for interaction by operator 317. Operator 317 can interact with interfaces 315 to control and manipulate vehicle 300.

Vehicle 300, UAV 350 and remote source 380 are each shown with various items. However, while FIG. 3 illustrates one example of how items are separated among vehicle 300, UAV 350, and remote source 380, this is by way of example only, and other arrangements are also contemplated herein.

Agricultural vehicle 300 can be a planting system, such as that described above with respect to FIG. 1, or a different vehicle. In one example, it comprises a propulsion system 302, a controller 310, which is coupled to one or more controllable subsystems 304. The controllable subsystems 304 comprise, for example, one or more depth adjustment mechanisms, such that the controller 310 can generate a control signal to adjust depth (such as planting depth) in response to detected soil parameters. In other examples, agricultural vehicle 300 can have other controllable subsystems 304, such as a residue cleaner, a chemical sprayer, etc., some of which are described in greater detail below.

Agricultural vehicle 300 also comprises a data store 320 configured to store temperature maps 322, soil moisture maps 328, a priori knowledge 324, as well as other relevant data 326. However, while data store 320 is illustratively shown in FIG. 3 as part of agricultural vehicle 300, such information can also be stored on remote source 380, within UAV memory 358, or in another suitable location accessible through a cloud-based or another networked infrastructure.

Controller 310 can, itself, include logic for generating a prescription 312 and map generator logic 309, which can be used to generate a map, as described in greater detail below. Controller 310 is also illustratively coupled to one or more sensors 306. Sensors 306 can sense a wide variety of different sensed variables. For instance, sensors 306 can include one or more temperature sensors, soil moisture sensors, as well as sensors related to the controllable subsystems 304. For example, they can include a down force sensor, a planting depth sensor or a depth sensor for another ground engaging implement.

Agricultural vehicle 300 can also include a positioning system 308, that, for example, provides an indication of the geographic location and orientation of agricultural vehicle 300. For example, positioning system 308 can be a Global Positioning System (GPS) or other system. Agricultural vehicle 300 also comprises a communication component 330 which is configured to communicate with UAV 350 and remote source 380. Communication can take place over a wired or wireless link using any of a variety of different techniques. In another example, communication component 330 is part of a mobile device used by an operator 317 of the agricultural vehicle 300, such as a smartphone, tablet computer, etc.

Vehicle 300 can include user interface mechanisms 311. Mechanisms 311 can be levers, pedals, a steering wheel, joystick, buttons or other mechanical mechanisms. They can include a display device, audio and/or haptic devices, electric or electronic input devices, or a wide variety of other devices as well. Vehicle 300 can include other items 313 as well.

UAV 350, in one example, includes a controller 354 that controls a propulsion system 352. Controller 354 can be coupled to one or more sensors 356. Sensors 356 can include, in one example, a geo-position sensor that senses a position of UAV 350 and one or more cameras configured to take images within a visual range, an infrared range, or another range of wavelengths. For example, UAV 350 can take an infrared image of a field in order to determine current soil temperatures. This can be used, for example, to determine which areas of the field are still frozen and which have thawed. Data captured from sensors 356, in one example, are stored within memory 358 of the UAV 350. However, sensor data 356 can also be transmitted to agricultural vehicle 300 using communication component 360. Additionally, sensor information can be transmitted to remote source 308 where it can be stored in remote source memory 384. UAV 350 can include other items 319 as well.

Remote system/source 380 can be a remote service (e.g., a cloud-based service or other service that is remotely accessible), a remote site or another remote system. It can include a communication component 382 and a data store or memory 384 and other items 321. As with the other communication components, component 382 illustratively communicates with vehicles 300 and 350. While FIG. 3 illustrates different functionality ascribed to each of agricultural vehicle 300, UAV 350, and remote source 380, it is to be understood that in at least some examples, the functionality is differently apportioned among agricultural vehicle 300, UAV 350 and remote source 380.

Before describing the operation of system 290 in more detail, a brief overview of its operation will first be provided. UAV 350 can obtain at least one georeferenced image of a field using sensors 356. The image, once taken by UAV 350, can be sent to vehicle 300 where it is processed, for example by controller 310, along with a priori knowledge 324, to generate a site specific prescription 312. A priori knowledge 324 can include, for example, at least some knowledge specific to known soil conditions, seed genetics, etc. The site specific prescription 312 can, for example, comprise a depth prescription for a row unit on a planter that indicates a prescribed seed depth over the field. Based on prescription 312, map generator logic 309 in controller 310 can generate a map that shows how the seed depth should change at different locations in the field, and controller 310 can generate a signal to control a row unit 304 such that the planting depth specified by prescription 312 is achieved according to the map. In one example, agricultural vehicle 300 includes a closed loop control system such that the actual depth measured by a row unit depth sensor 306 is then reported back to controller 310 which adjusts a depth controlling mechanism (such as a down force actuator) on the row unit 304 accordingly, based on the measured depth and the prescribed depth.

While FIG. 3 has been discussed in the context of a planter depth control example, there are many other examples in which systems and methods described herein can be used. Some include seeding, fertilizing applications, application of other material, crop residue incorporation, seed bed preparation, construction site preparation, turf site preparation as well as forestry site preparation.

Figure 4:
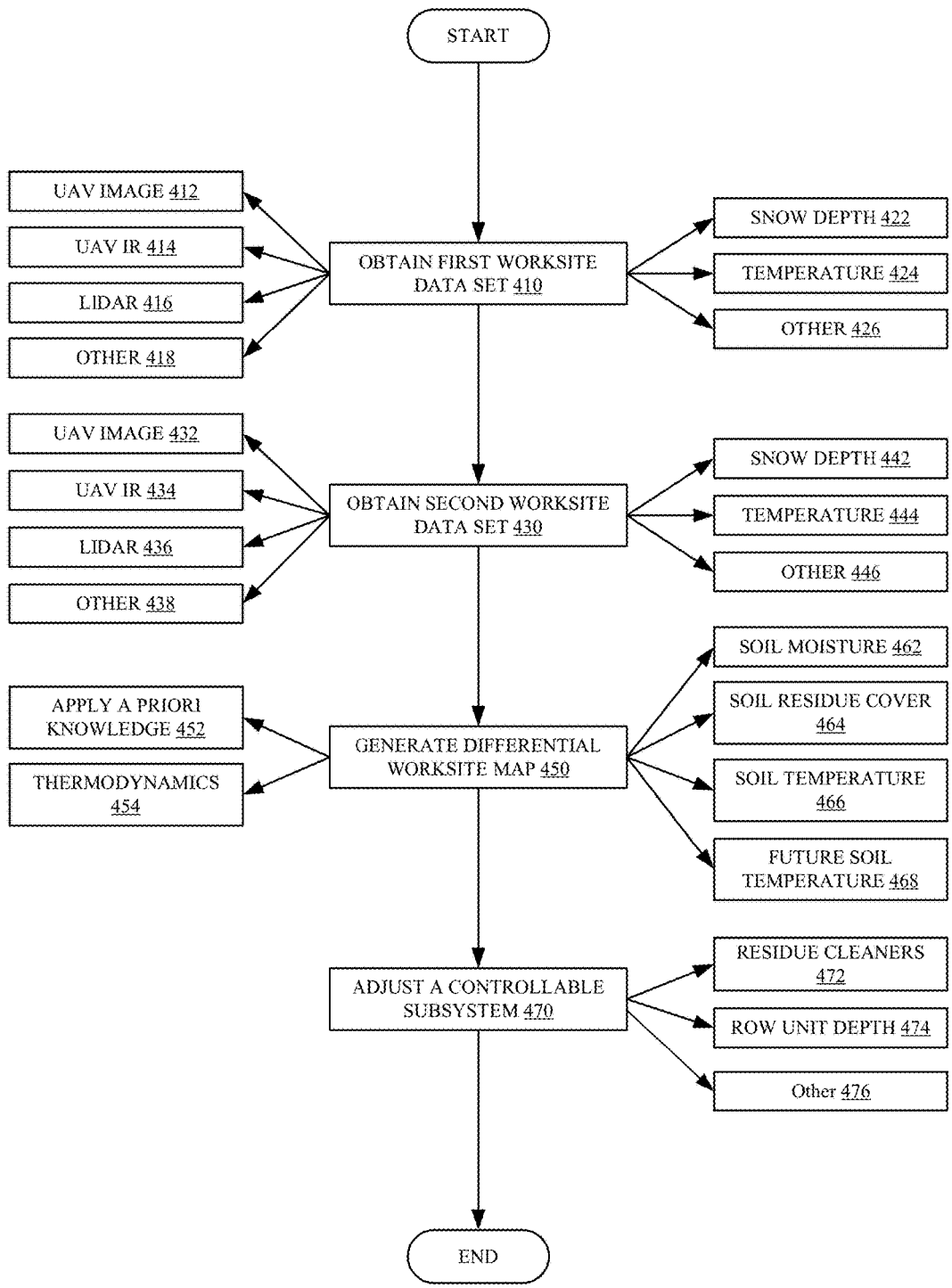
FIG. 4 is a flow diagram of one example of the operation of the agricultural system in controlling a subsystem based on collected agricultural worksite data.

FIG. 4 is a flow diagram of one example of the operation of system 290, shown in FIG. 3, in controlling a controllable subsystem 304 based on collected agricultural worksite data. The operation shown in FIG. 4 is one example for gathering and applying a variety of worksite data to adjust a controllable subsystem 304 throughout an agricultural application. While it is discussed in the context of gathering data related to snow depth and temperature in order to implement a planting operation, additional or different data can also be gathered in anticipation of other agricultural operations. Additionally, while FIG. 4 is discussed in the context of the agricultural system illustrated in FIG. 3, it can also be used in other systems.

In block 410, a first worksite data set is obtained. For example, UAV 350 can obtain a geo-referenced image of a field, as indicated in block 412. The UAV image obtained in block 412 can be, in one example, an image taken within the visual spectrum. However, the UAV image can also be an image in the Infrared (IR) spectrum, as indicated in block 414. In another example, a first worksite data set is obtained using Lidar, as indicated in block 416. A first worksite data set can also include other data as indicated in block 418, for example known topography data related to the field, or data obtained through another mechanism, such as a machine-based sensor 306 or other sensor or data source.

The data set obtained in block 410 can relate to a number of different parameters. In one example, the first worksite data set obtained in block 410 comprises snow depth data, as indicated in block 422. The snow depth can be determined by combining a measured height of the snow surface with topographic information for that same location. By subtracting the altitude of the ground (as indicated by the topographic information) from the measured or sensed altitude of the surface of the snow (as indicated by the captured snow depth data), the snow depth can be determined for that particular geographic location of the field. This can be repeated at a plurality of different locations in the field.

In another example, the first worksite data set comprises temperature data, as indicated in block 424. Other data, as indicated in block 426, can also be obtained as part of a first worksite data set. For example, soil moisture content can be obtained, or derived, based on snow depth data 422, or temperature data 424, or a combination of that and/or other data. The first data set obtained in block 410 can cover an entire field, or a portion of a field. It can include multiple geo-referenced measurements taken from various sensors, or other information.

In block 430, a second worksite data set is obtained. In one example, the second worksite data set is obtained at a later time than the first worksite data set (for example on a different day). This allows the variation in the two data sets (e.g., the two images) to be captured for processing. For instance, as described above, the variation or difference between two images that represent snow depth data can be captured. This can indicate how much snow has de-accumulated (eg, melted, sublimated, or evaporated).

However, in another example, a first worksite data set and second worksite data set are separated by a longer interval. For example, the first worksite data set can be obtained at the end of a previous harvest season, and second worksite data set more recently.

The second worksite data set can be obtained, for example, as a UAV visual spectrum image using a camera, as indicated by block 432, a UAV infrared (IR) image using an IR sensor, as indicated in block 434, using Lidar, as indicated in block 436, or using another mechanism, as indicated in block 438.

The second worksite data set obtained in block 430 can also relate to one or more soil parameters. For example, as mentioned above, the second worksite data set can represent snow depth data, as indicated in block 442, temperature data as indicated in block 444, and/or other data, as indicated in block 446. As described above with respect to block 426, the data can be measured or derived to represent things such as soil moisture or other parameters. In one example, the first data set and the second data set include data that represents the same soil parameter information. Thus, the variation in that parameter over time can be obtained. In at least one example, the first data set and the second data set each include data that represents to at least two or more soil parameters. All of these scenarios are contemplated herein.

In block 450, a differential worksite map is generated. Generating a differential worksite map comprises combining the second worksite data set, obtained in block 430, with the first worksite data set, obtained in block 410. For example, in order to determine a snow water equivalent (SWE) absorbed by a field, a current snow depth (which may be represented by data in the second data set—for example snow depth 442), is subtracted from a previous snow depth (for example snow depth 422) to determine the amount of snow that has de-accumulated from the field. This can be used to generate a snow water equivalent that de-accumulated from various geographic areas of the field during the duration between the first image and the second image, and thus the amount of moisture that melted into the ground or evaporated during that time. Such information can then be used to calculate or estimate soil moisture content for those areas of the field.

In some examples, multiple parameters are incorporated into a single differential worksite map. For example, some of the difference between snow depths 422 and 442 may arise from evaporation, or sublimation, as opposed to melting and absorbing into the field. Temperature information 444 and/or 424 can provide an indication that some snow melted and the moisture was absorbed into the ground, for example, by showing that a soil temperature was above 0° C. for a given time period between when snow depths 422 and 442 were measured.

Generating a differential worksite map, as indicated in block 450, can include applying a priori knowledge to the obtained worksite data sets as well, as indicated in block 452. For example, a priori knowledge could help compensate factors contributing to the obtained data set, but not depending on the soil parameters of interest. Some examples of a priori knowledge that can be applied include: soil type, landscape position, topography, and solarscape position (for example, is the portion of the worksite flat, tilted toward the sun, tilted away from the sun, etc.).

Generating a differential worksite map, as indicated in block 450, can also include applying thermodynamic knowledge, as indicated in block 454. The change in soil temperature can be heavily affected by soil moisture. Thus, temperature differences can be primarily attributed to soil moisture differences based on the effect that soil moisture has on thermal inertia, as shown in Table 1.

TABLE 1

Typical Values for Specific Heat and Density

| Constituent | Specific Heat, $c_i$ (J kg$^{-1}$ ° C.$^{-1}$) | Density (kg m$^{-3}$) | Specific Heat, $c_v$ (MJ m$^{-3}$ ° C.$^{-3}$) |
|---|---|---|---|
| Soil Minerals | 733 | 2650 | 1.94 |
| Soil Organic Matter | 1926 | 1300 | 2.5 |
| Water | 4182 | 1000 | 4.184 |
| Air | 1005 | 1.2 | 0.0012 |

Because the specific heat of water is so much higher than soil minerals, soil organic matter or air (which can be discounted because of its negligible contribution to volumetric heat capacity) temperature differences are strongly related to soil moisture differences.

Generating a differential worksite map, as indicated in block 450, can include generating a data set that indicates soil moisture across the worksite, as indicated in block 462. The soil moisture can be sensed or derived in a variety of ways.

Generating a differential worksite map, as indicated in block 450, can also include detecting soil residue cover, as indicated in block 464. There can be at least some insulating effects in a field due to crop residue. A soil residue map can provide some assistance in determining which portions of the worksite have temperature differences impacted by residue. UAV sensors 356, in one example, have spatial resolution in the millimeter-to-centimeter range, and can capture wavelength data that enable a comparison of temperature difference in residue covered and uncovered portions of a worksite, which are very small and in close proximity to one another. Such spatial comparisons enable residue mass or thickness to be estimated.

In another example, generating a differential worksite map includes generating a data set indicating soil temperature 466 throughout the worksite. This can also be measured or derived. Additionally, in one example, generating a differential worksite map also includes a projected future soil temperature 468 based on the worksite data available and expected weather conditions, for example within the next 7-10 days. These are all examples of differential worksite maps and others are also contemplated herein.

In block 470, a controllable subsystem is adjusted, for example based on information from one or more differential worksite maps. In one example, multiple worksite data sets are generated, and accessible by controller 310, such that adjustment of several different controllable subsystems 304 is performed simultaneously or substantially simultaneously. For example, as planter 114 moves across a field from a dryer area to a wetter area, controller 310 can generate a signal to modify force exerted by a down force actuator. This can vary planting depth as indicated by block 474. In another example, a residue cleaning member can be adjusted, as indicated in block 472, based on a soil residue cover map. In yet another example, a propulsion system 302 can be controlled to vary travel speed of vehicle 300, in block 472, in response to an indication of a change in soil moisture content. Other controllable subsystems can be controlled as well, as indicated by block 476.

Adjustments of controllable subsystems 304, as indicated in block 470, can be pre-computed or computed dynamically in near real time. They can also occur periodically as an agricultural machine travels throughout a worksite. For example, as the agricultural machine approaches an area of high soil moisture, the row unit depth, as indicated in block 474, may be decreased. Additionally, adjusting a residue cleaner, as indicated in block 472 can comprise adjusting an operating parameter such as the angle of a residue engaging member relative to the direction of travel, the height above ground, or rotational speed. These adjustments can be made based on the differential soil residue cover map generated in block 464. Additionally, in at least one example, adjusting a controllable subsystem comprises taking into account a sensor that is sensing during the planting operation as the agricultural vehicle moves throughout a field. This may include, for example, communication with one of sensors 306 that is attached to agricultural vehicle 300, or communication with a remote sensor (such as a remote contact soil temperature sensor, a non-contact soil temperature sensor, a soil moisture sensor, a soil residue cover sensor, a soil type sensor, a soil organic matter sensor, or any other sensor in contact with the soil at the worksite).

While FIG. 4 has been discussed in context of several soil parameters, for example snow depth, temperature, soil moisture, and soil residue cover, it is to be understood that the discussion provided herein can also be used for other obtained soil parameter information. The relationship between temperature change, snow depth change, or other measured or derived changes and a variety of soil parameters can be determined empirically. Additionally, while adjustability of controllable subsystems has been discussed, for example with regard to block 470, it is to be understood that the particular values for the adjustments can be obtained using a variety of mechanisms. These can include, for example, applying the obtained soil parameters to known equations, the use of lookup tables, fuzzy logic, neural networks, rules based systems, etc. Further, the best adjustment values for a sensed condition can be determined empirically, or otherwise as they may depend on seed genetics, seed environment, machine capability, etc. For example, Table 2 shows one example of a seed depth prescription for a field with varying soil temperature, given a particular seed type, soil type, etc.

TABLE 2

Seed Depth Prescription based on Projected Soil Temperature

| Future Soil Temperature | Seed Depth |
| --- | --- |
| Temperature less than 40° F. | 1.25" |
| 40° F. < Temperature < 45° F. | 1.5" |
| 45° F. < Temperature < 50° F. | 1.75" |
| 50° F. < Temperature | 2.0" |

Additionally, in one example, seed depth can be set as a function of future soil temperature. The future soil temperature, in one example, is estimated from temperature measured at a base time (for example the time when the first worksite data set obtained in block 410), the duration of the sample period (for example the time between obtaining the first worksite data set and the second data set obtained), and then extrapolating the temperature increase trend based on when planting will occur. For example, the first and second worksite data sets obtained in blocks 410 and 430 can be obtained before or near sunrise (to allow for transient surface temperature effects, being in direct sunlight, to dissipate) and a mid-afternoon temperature obtained by extrapolating an expected temperature change from mid-morning to mid-afternoon. Future soil temperature can also be obtained, for example, from a forecast of air temperature, and an application of pre-defined equations regarding soil temperature and air temperature taking thermal inertia into account. These are examples only.

In another example, desired seed depth can be determined as a function of two variables, such as a future soil temperature and soil moisture estimated using thermal inertia. In a further example, soil type is also used in conjunction with soil temperature and soil moisture as variables to determine an appropriate planting depth. Planting depths based on known temperature and moisture conditions can also be derived using other information available to a specific farmer's soil conditions and climate.

Figure 5:
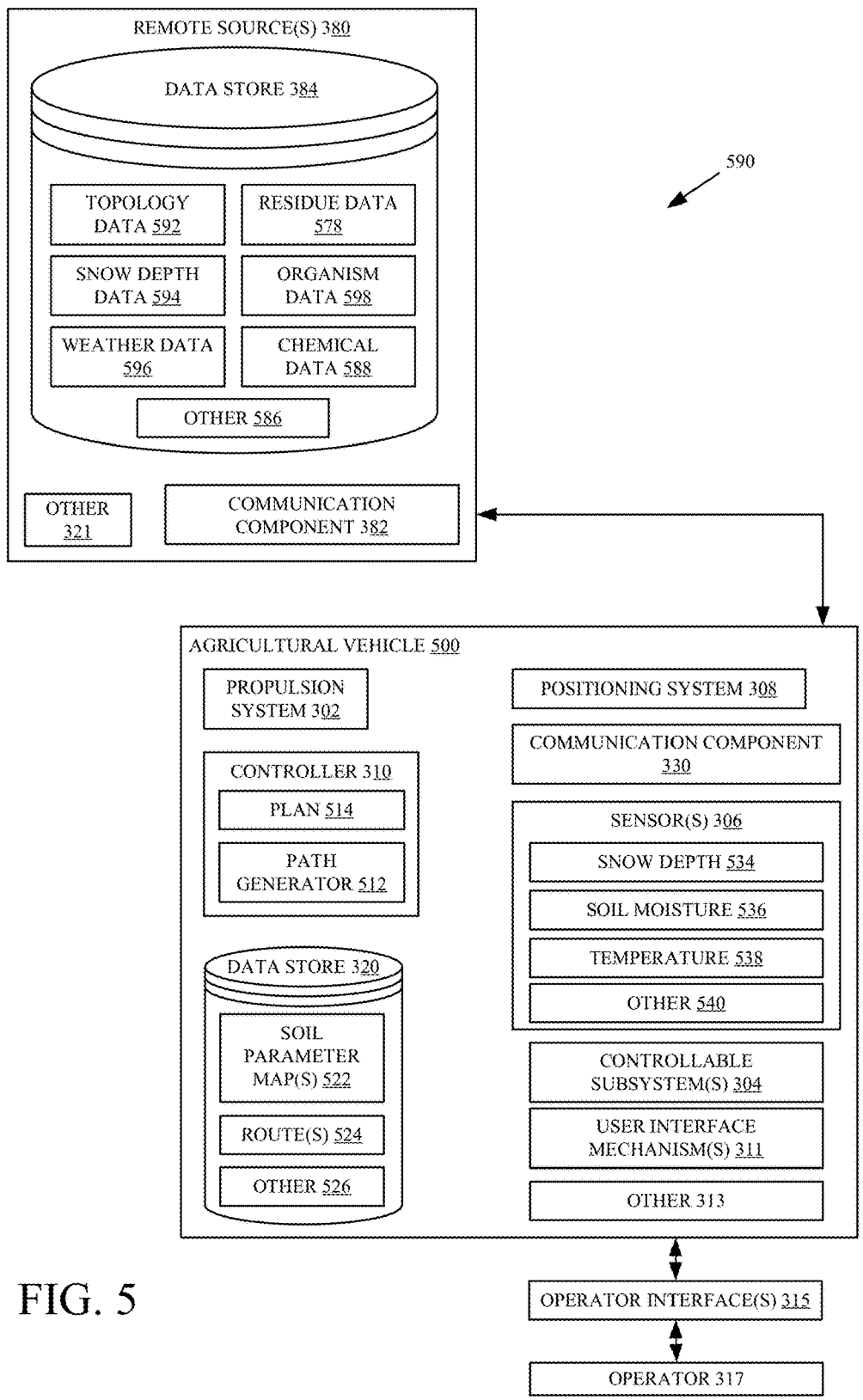
FIG. 5 is an example agricultural system in communication with a remote source of data.

FIG. 5 is a block diagram of one example of an agricultural system 590 that includes an agricultural vehicle 500 in communication with a remote source of data 380. Agricultural system 590 can be used for treating a worksite (such as spreading or spraying chemicals such as fertilizer, pesticides, herbicides, etc). Agricultural system 590, in some examples, is similar to agricultural system 390, shown above in FIG. 3, with similar components numbered similarly. Agricultural system 590 can be configured to assist a farmer in site-specific application of, for instance, chemicals on a worksite based on a soil parameter, for example snow depth, temperature, soil moisture, residue cover, etc. Chemicals that can be applied to a field can include fertilizers, pesticides, herbicides, fungicides, nematicides, or any other chemical applied to a worksite.

Agricultural vehicle 500 can include a propulsion system 302, configured to provide power to move agricultural vehicle 500 through a field. Propulsion system 302 can be coupled to, and controlled by, controller 310. Controller 310 is also coupled to a positioning system 308 which is configured to provide an indication of a location of agricultural vehicle 500 within a worksite. Positioning system 308, in one example, is a GPS, or any other positioning system.

Controller 310 is also coupled to a communication component 330 which enables communication between agricultural vehicle 500 and remote source 380. Controller 310 is also coupled to a number of sensors 306, including, as examples, a snow depth sensor 534, a soil moisture sensor 536, a temperature sensor 538, and any other sensors 540. Controller 310 is also, in one example, coupled to one or more controllable subsystems 304, for example controllable items on row units, residue cleaners, etc.

Controller 310 can also be coupled to a local data store 320, in one example, which can include information such as a soil parameter map 522, an operation route 524, as well as other information 526 relevant to the operation of agricultural vehicle 500. Soil parameter map 522 can include geo-referenced data for a worksite. The data can be indicative of soil moisture, temperature, snow depth, residue cover, etc. Also, while data store 320 is illustrated as part of agricultural vehicle 500, it is to be understood that data store 320 could be deployed in another arrangement. For example, it may be partially on agricultural vehicle 500 and partially on remote source 380, fully stored within remote source 380, or fully stored elsewhere, such as within a cloud-based infrastructure. Additionally, while sensors 306 are shown specific to agricultural vehicle 500, it is to be understood that at least some of the sensors 306 can be stationary sensors not configured to move with the agricultural vehicle 500, but to remain at location within the worksite, and accessed through communication component 320, in one example.

Remote source 380, in one example, includes a communication component 382 configured to allow for communication between remote source 380 and agricultural vehicle 500. Remote source 380 can also include a data store 384 with historic information and/or recently obtained data about a worksite and/or agricultural vehicle 500. For example, data store 384 can include topology data 592 relative to a given worksite, snow depth data 594, and weather data 596 which can include historic, current, and projected future weather data. The data can indicate air temperature, precipitation, or other items. Remote source 380 can also include chemical data 588, including historical data chemical application to a worksite, as well as information about chemicals on hand, and an anticipated chemical application plan.

Remote source 380 can also contain organism data 598, including historic data on pest presence throughout the worksite, for example weeds, funguses, and other organic pests. Organism data 598 can also include mortality rates or reproductive rates under various environmental conditions and lifecycle stages for relevant organisms. Relevant organisms can include, for example, bacteria, fungus, nematodes, and plants (including weeds) insects, or any other organism that is potentially found within a given worksite. This information can also be correlated to temperature or other data, and to an expected population of organisms. For example, temperatures below 18.5° F. can kill corn rootworm larvae and 50% of third instar western corn rootworm larvae die in saturated soils after 24 hours at 77° F. Such information is useful in determining which chemicals are necessary to apply, and how much must be applied in order to control a desired pest population.

Residue data 578, in one example, comprises geo-referenced data indicative of the amount of residue on, or in, the soil of a worksite. The amount of residue can be directly measured or inferred from yield data from a prior harvest, for example. Residue data can also include the amount of residue removed from a worksite through a process such as baling. In some examples, the amount of residue in the field can be determined from a total residue amount and an incorporation factor related to the type of tillage employed on a given worksite.

Remote source 380 can also include any other information 586 relevant to agricultural vehicle 500, or the maintenance or treatment of a given worksite.

At least some of the data stored within data store 384 can be gathered by a remote sensor, for example a UAV as described above with respect to FIG. 3, a ground-based vehicle, or another suitable source, such as Lidar, radar or satellite imagery. In at least some examples, remotely sensed data can be compared to data collected from ground-based sensors, such as sensors 306 attached to agricultural vehicle 500, or other sensors located throughout a worksite, in order to verify data from a remote site. Additionally, while data has been discussed as being obtainable from a UAV, in other examples at least some of the data within data store 384 can be collected from a sensor mounted on the ground, a terrestrial vehicle, a manned aircraft, a balloon, satellite or any other mounting location. Additionally, while snow depth data 594 can indicate a depth calculated as the difference between a snow surface and the ground surface, some sensors or processors can provide (or estimate) a water content based on the snow depth, or a snow water equivalent measurement.

While at least some examples described herein relate to data obtained while snow partially covers a field, some methods and systems are also useful after snow has completely evaporated or melted. For example, in summer planting, soil moisture content or soil saturation information are also detectable in a number of ways, including thermal inertia calculations applied to collected worksite data.

Based on information obtained from a remote source 380, controller 310 can be configured to create a plan 514. Plan 514, in one example, is a chemical application plan with a map generated for a given worksite, along with corresponding application rates for chemicals. Vehicle 300 can be any appropriate agricultural vehicle, such as a spreader, a sprayer or any other suitable chemical applicator. Agricultural vehicle 500, in one example, can control the rate of a chemical applied to a worksite as the vehicle moves over the site based on a designated application rate indicated by plan 514.

Figure 6:
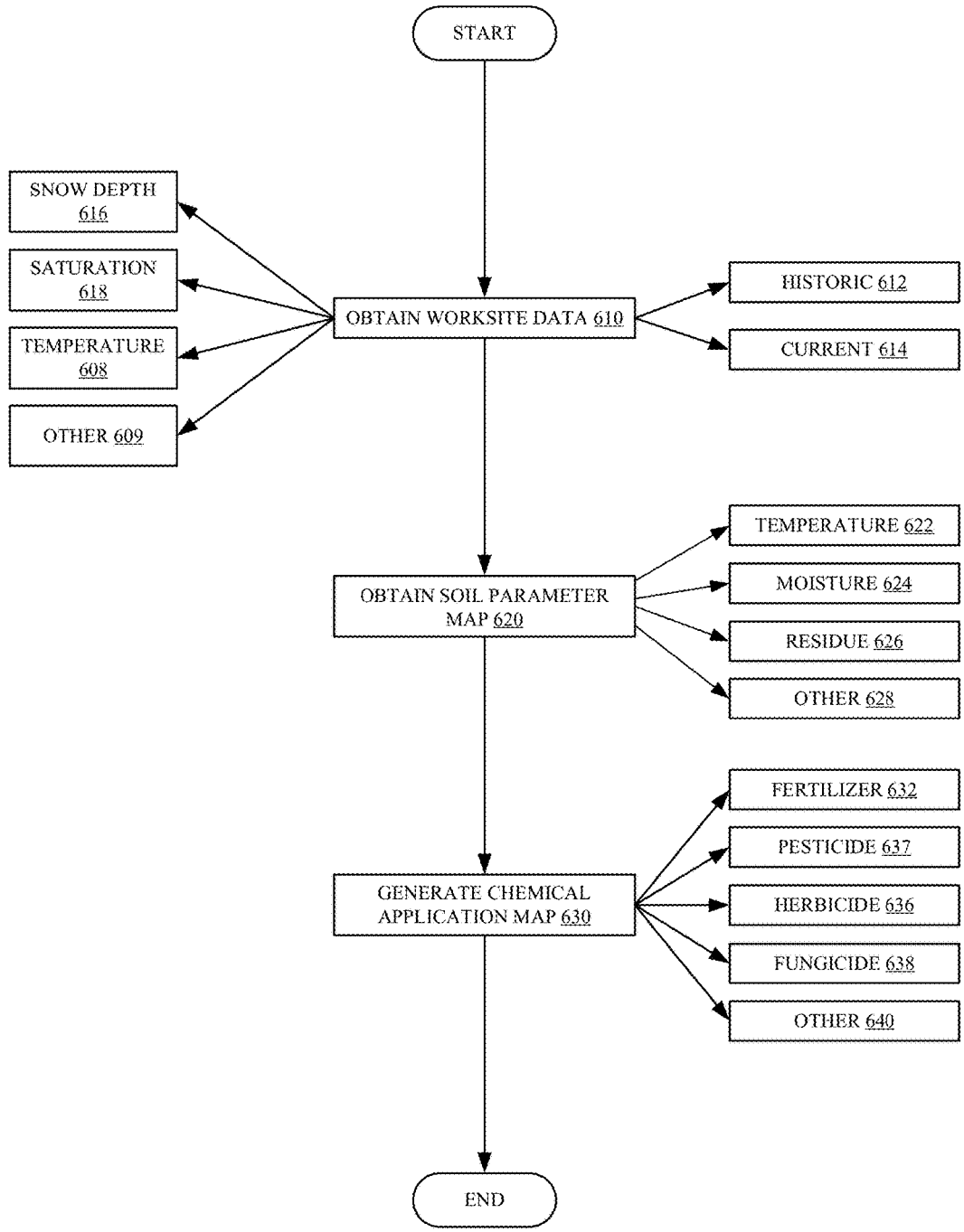
FIG. 6 is a flow diagram of one example of the operation of the agricultural system shown in FIG. 5 in generating a chemical application map.

FIG. 6 is a flow diagram showing one example of the operation of system 590 in generating a chemical application map. The map can be used to determine where, and how much of a given chemical is needed at different locations of a worksite, for example. It will also be noted that the map may be precomputed by another system and loaded onto system 590, or it can be generated by system 590, itself.

In block 610, worksite data is obtained. Some obtained worksite data comprises historic data, as indicated in block 612, and some obtained data comprises more recent (e.g., current) data 614. Historic and more recent data can comprise data obtained on different days, data obtained weeks apart, or, for example, data obtained from a last harvest compared to data obtained currently. Worksite data can include such things as snow depth data, as indicated in block 616, soil moisture or soil saturation data, as indicated in block 618, or soil temperature data, as indicated in block 608. Worksite data can be obtained from, in one example, a remote source such as remote source 380, from an agricultural vehicle, such as agricultural vehicle 500, or another suitable source, such as UAV 350.

In block 620, a soil parameter map is obtained. The soil parameter can be, for example, a temperature map of the field, as indicated in block 622, a soil moisture map of the field, as indicated in block 624, or a soil residue map of the field, as indicated in block 626, or a map of one or more other relevant parameter, as indicated in block 628. The soil parameter map, in one example, is generated by map generator logic 309 or other portions of controller 310, based on the worksite data obtained in block 610. In another example, the soil parameter map is retrieved from data store 384.

In block 630, a chemical application map is generated. In one example, the chemical application map is generated based on geo-referenced soil parameter information for the worksite. The application map indicates where, and how much of a chemical should be applied to different locations of a worksite. For example, it can indicate how much fertilizer, as indicated in block 632, pesticide, as indicated in block 637, herbicide, as indicated in block 636, fungicide, as indicated in block 638, and/or other chemicals, as indicated in block 640. The application map generated in block 630, in one example, can also indicate application rates or quantities for simultaneous application of multiple chemicals across a worksite.

Figure 7:
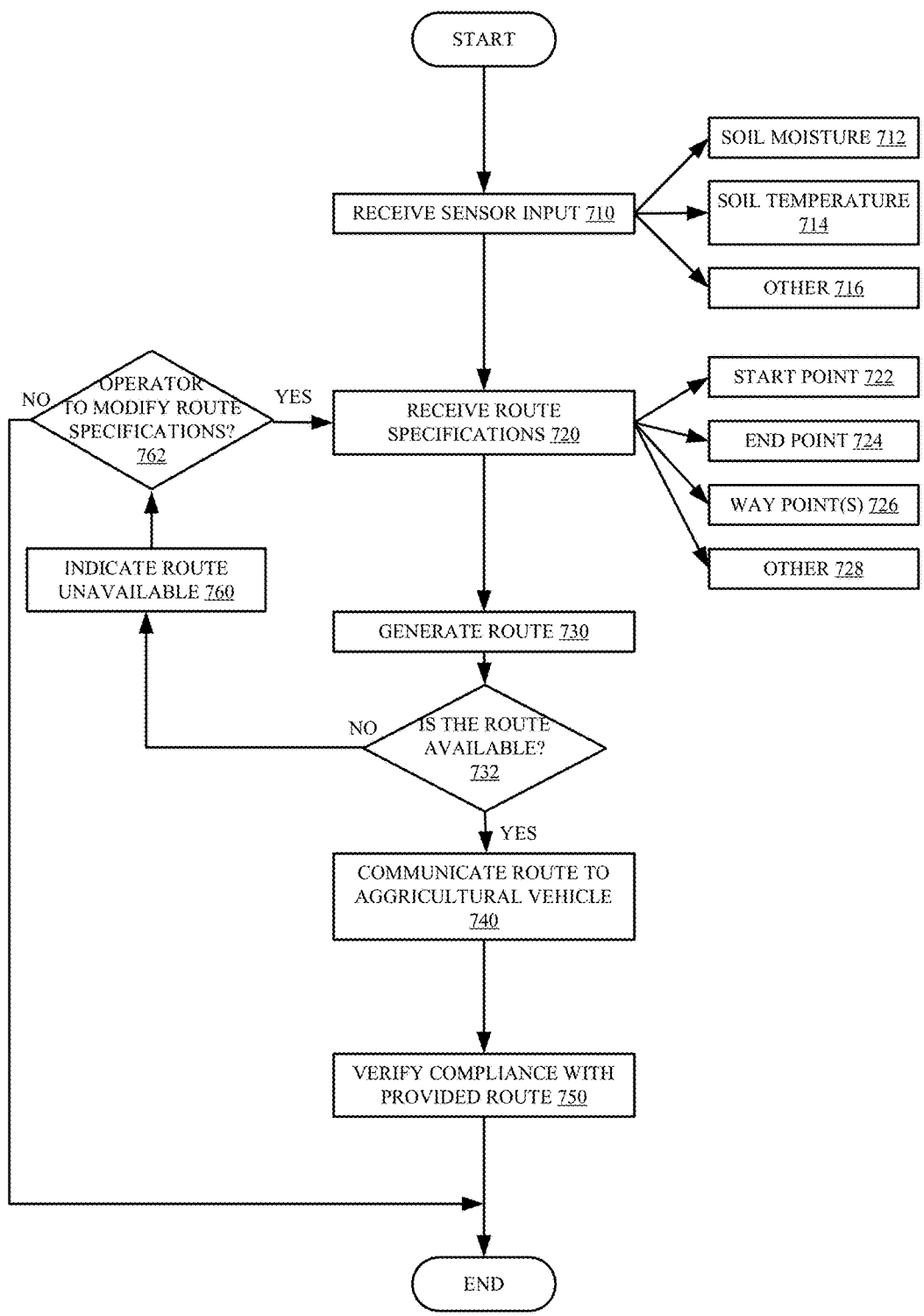
FIG. 7 is a flow diagram of one example of the operation of the agricultural machine shown in FIG. 5 in generating a trafficability route for an agricultural machine.

FIG. 7 is a flow diagram showing one example of the operation of system 590 in generating a trafficability route for an agricultural machine. Again, the route can be precomputed and loaded onto system 590, or generated by system 590, itself. Several methods and systems have been described herein for determining parameters for one or more controllable subsystems within an agricultural machine based on soil parameters. In at least some examples, such information is useful when applied to identify a route for traversing a given worksite. For example, while it is helpful to know that soil moisture is high in a given field area and therefore seeds must be planted at a shallower depth, such information can also be useful for determining whether a route is even available, or whether it is too wet to drive on, based on soil moisture content. If soil contains too much moisture, it might not be possible for an agricultural vehicle or forestry vehicle or construction vehicle to even travel along a given route. The operation shown in FIG. 7 illustrates one example for generating a route, and also indicating whether it can be traversed by the vehicle. The generated route could be used by either agricultural vehicle 300 or 500 to conduct a planting operation or a chemical application operation or any other operation. It can also be used by other vehicles to conduct operations or just to move across a site.

In block 710, a sensor input is received. The sensor input can include historic and/or current information about any of a wide variety of soil parameters that might bear on route calculation. Therefore, it can include the soil moisture content within a worksite, as indicated in block 712, soil temperature, as indicated in block 714, or a wide variety of other information as indicated in block 716, for example information about chemicals to be applied to the worksite, etc.

In block 720, route specifications are received. In one example, this comprises receiving, through a user input, information about an operator's desired route. Route specifications can comprise at least a start point 722, an end point 724 and one or more way points 726. Additional or different route specifications are contemplated as well. For example, an operator may be attempting to determine whether it is possible to apply chemicals, or plant seed, across an entire worksite, or a portion of a worksite. In such an example, in block 720 the operator enters route specifications that include an indication that the operator will be traversing the entirety of a worksite, or a specified portion of a worksite. However, in another example, receiving route specifications comprises an operator indicating a desire to move an agricultural vehicle from a start point to an end point, with one or more waypoints in between. The specification may include a wide variety of other things as well, such as machine specifications for the vehicle (e.g., weight, tire or track configurations, etc.) or other information.

In block 730, a route is generated by route or path generator 512. In one example, generating a route comprises generator 512 determining whether a route is even available, for agricultural vehicle 500, given the received route specifications, and based on known information about the field. This is indicated by block 732. For example, there could be an area within a worksite where soil moisture content is so high that it prevents agricultural vehicle 500 from traveling a route that meets all of the route specifications. In one example, generator 512 takes into account information about agricultural vehicle 500, for example weight, tire width, attached implements, etc., which can affect whether vehicle 500 can traverse any given portion of the field, given the field's topography, moisture content, soil temperature, etc. . . .

In block 760, an operator might receive an indication that the desired route is unavailable, or partially unavailable, if generator 512 is unable to generate a route satisfying all conditions or route specifications. For example, it might not be possible to travel to all desired waypoints because of too many areas within the field that are too wet to support agricultural vehicle 500, or a towed implement. In another example, a route is unavailable because an operator has indicated a desire to plant seeds in areas where the ground is too cold for planting, such as where the ground is still frozen.

The indication that the route is unavailable may take many forms and include a variety of different kinds of information. For instance, the operator may receive an indication of which areas of the field cannot be traveled, or are not suitable for the desired application, and the reason. It may also suggest an alternate route that conforms to most of the specifications, but deviates in certain areas that are un-trafficable. It can take many other forms as well.

In block 762, in one example, the operator is prompted to remove one or more waypoints 726, select a different start point 722, or a different end point 724, remove a portion of the worksite, select a different agricultural operation, or otherwise modify the route specifications. If the operator does this, processing reverts to block 720.

If, at block 730, an available route is generated, then at block 740, the generated route is communicated to agricultural vehicle 500. In one example, the generated route is communicated to controller 310 which, using positioning system 308, positions agricultural vehicle 500 at a desired start point and guides navigation of agricultural vehicle 500 along the generated route. The generated route, in one example, is sent from remote source 380 (for example a mobile computing device of an operator) or another computing device with access to information about the worksite. In another example, the generated route is provided by generator 512 in controller 310 to an operator on an interface 315 within agricultural vehicle 500, such as on a display device or other device. In one example, the route comprises a set of instructions for the operator. In another example, the route is communicated to the positioning system 308, which provides directions for the operator on a display. In yet another example, the route is used by controller 310 to automatically control steering and drive functions in the propulsion system 302 to navigate vehicle 500.

In block 750, compliance with the provided route is monitored. Controller 510, in one example, indicates when a deviation is observed, for example on a display within agricultural vehicle 500. In another example, monitoring compliance comprises remote source 380 tracking a position of agricultural vehicle 500, provided by positioning system 308, against the generated route, and providing an indication of a deviation and remedial action. In another example, monitoring compliance comprises controller 310 automatically receiving a position of agricultural vehicle 500, from positioning system 308, and comparing it to the generated route, and adjusting a controllable subsystem 304 to correct for a detected deviation. For example, controller 310 can adjust a propulsion or steering system 304.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
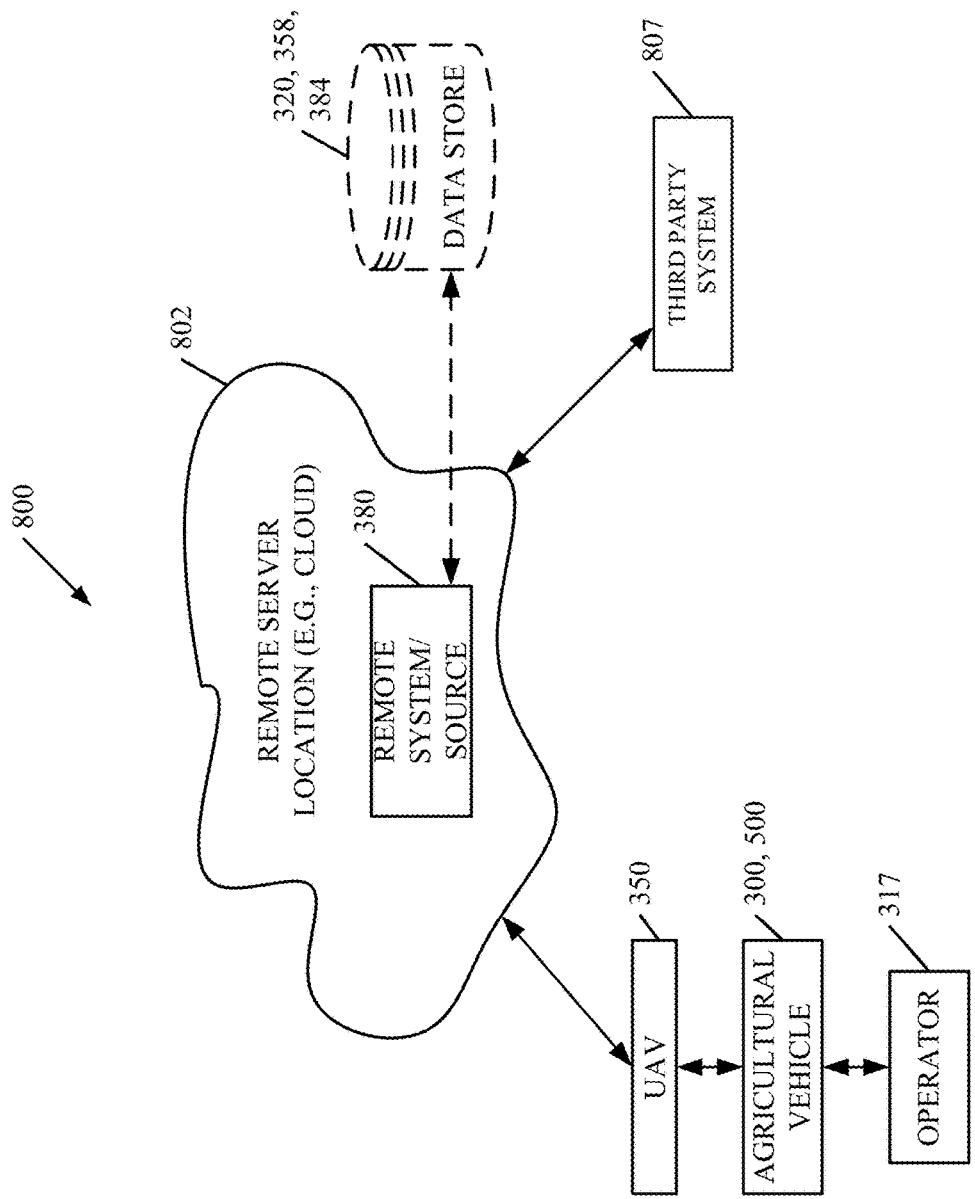
FIG. 8 shows one example of how information can be used in a remote server architecture.

FIG. 8 is a block diagram of one or both agricultural machines 300, 500, communicating with elements in a remote server architecture 800. In an example, remote server architecture 800 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in the previous Figures as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

FIG. 8 illustrates one example of a remote server architecture. FIG. 8 also shows that it is contemplated that at least some elements are disposed at a remote server location (which can be a cloud or other location) 802 while others are not. By way of example, data stores 320, 358, 384 or a third party system 807 can be disposed at a location separate from remote server location 802. Other parts of agricultural machines 300, 500 (e.g., parts of a control system) can also be stored at a remote server location 802, or elsewhere. Further, remote system/service 380 can be deployed at location 802 as well. Regardless of where they are located, they can be accessed directly by agricultural vehicles 300, 500 (or a user 317) through a network (either a wide area network or a local area network). They can be hosted at a remote site by a service, or they can be provided as a service, or accessed by a connection service that resides in a remote location. Also, the data can be stored in substantially any location and intermittently accessed by or forwarded to interested parties. For instance, physical carriers can be used instead of, or in addition to, electromagnetic wave carries. In such an embodiment, where cell coverage is poor or nonexistent, another mobile machine (such as a fuel truck) can have an automated information collection system. As vehicles 300, 500 (or any UAVs 350) comes close to the fuel truck for fueling, the system automatically collects the information from the vehicle (or UAV) using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information may be stored on the agricultural vehicles 300, 500 until vehicles 300, 500 enter a covered location. The vehicles 300, 500, themselves, can then send the information to the main network.

It will also be noted that the elements of FIGS. 3 and 5, or portions of them, can be disposed on a wide variety of different devices. Some of those devices include servers, desktop computers, laptop computers, tablet computers, or other mobile devices, such as palm top computers, cell phones, smartphones, multi-media players, personal digital assistance, etc.

Figure 9:
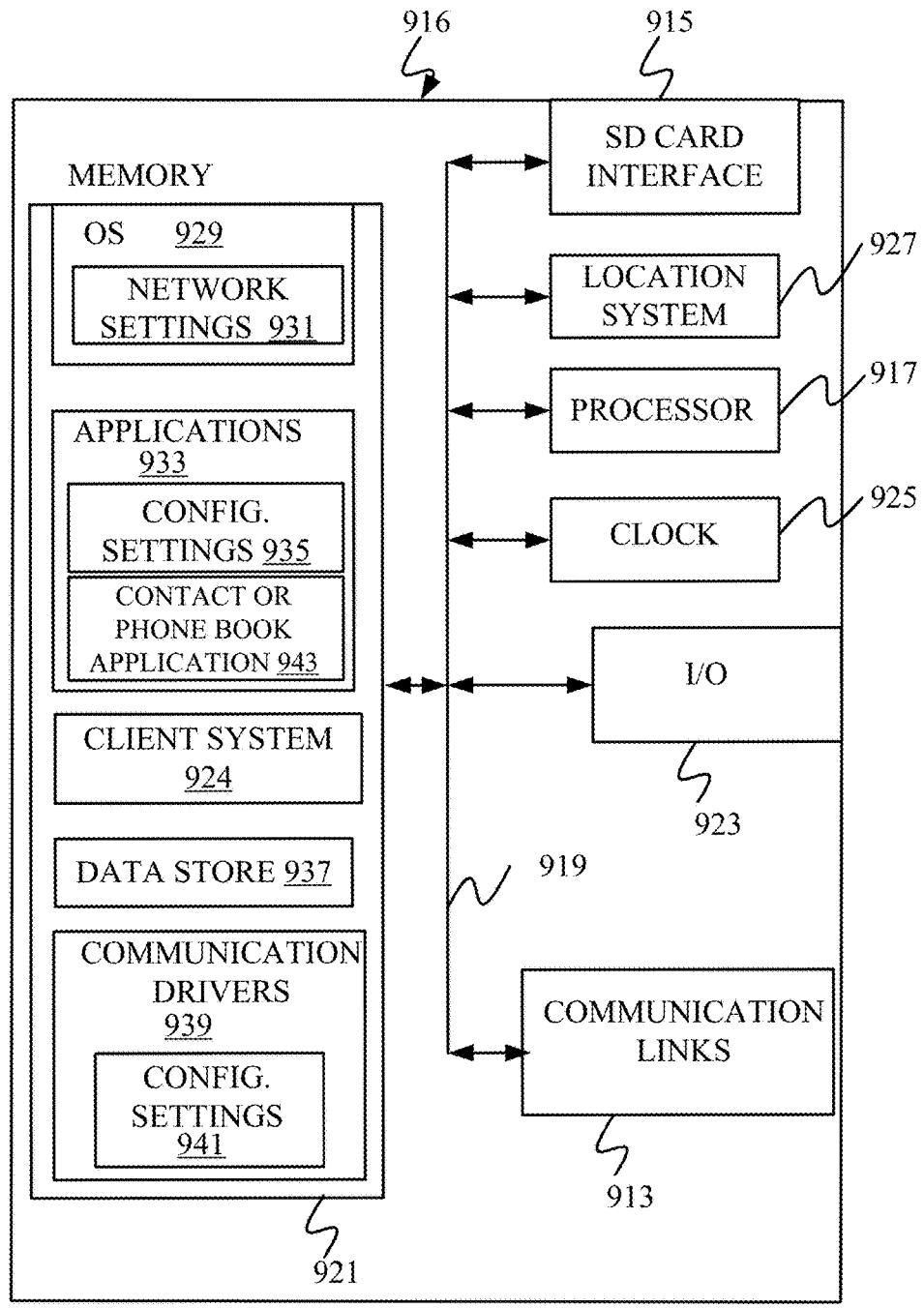
FIGS. 9-11 show examples of mobile devices that can be used in architectures shown in the previous figures.
Figure 10:
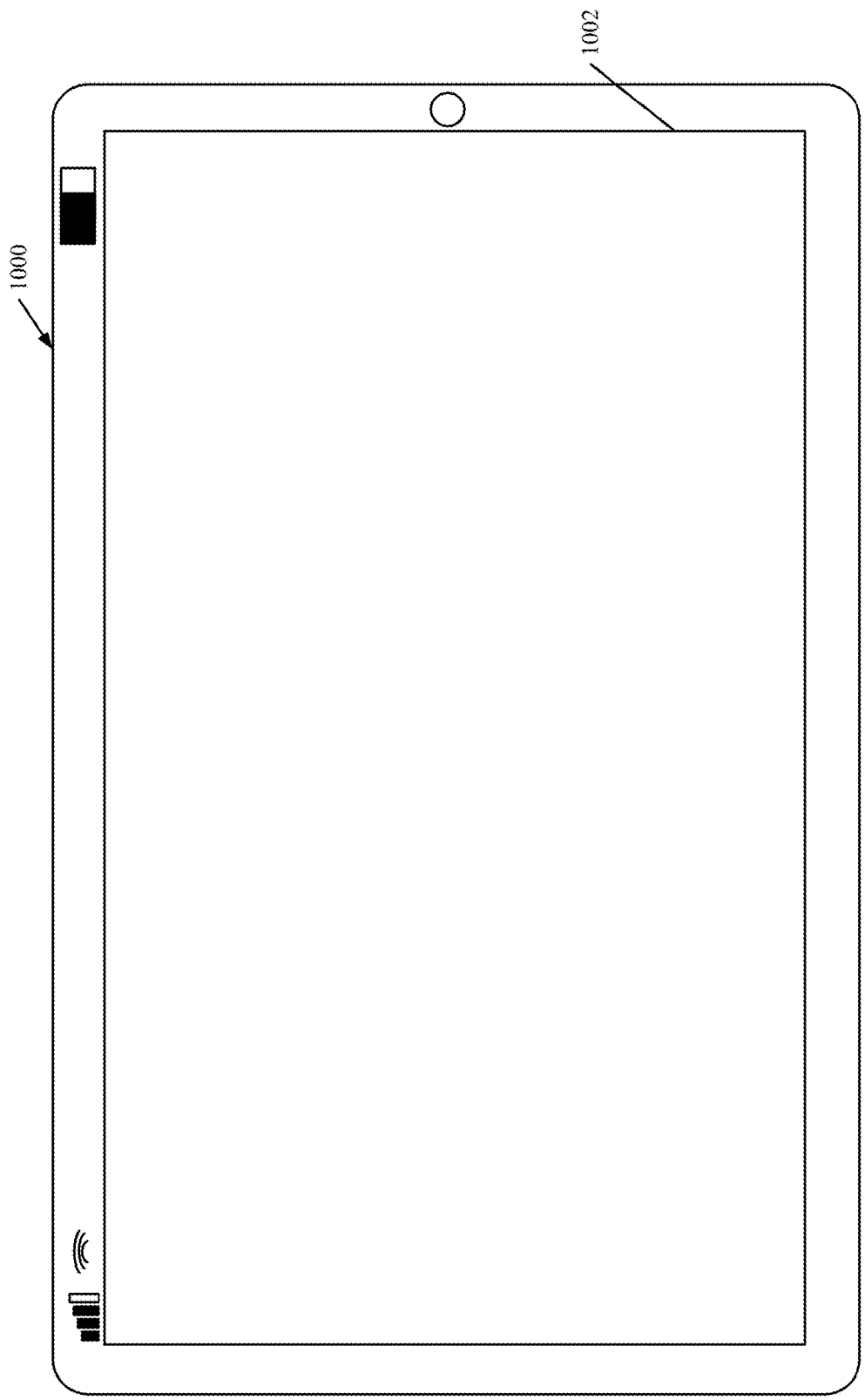
Figure 11:
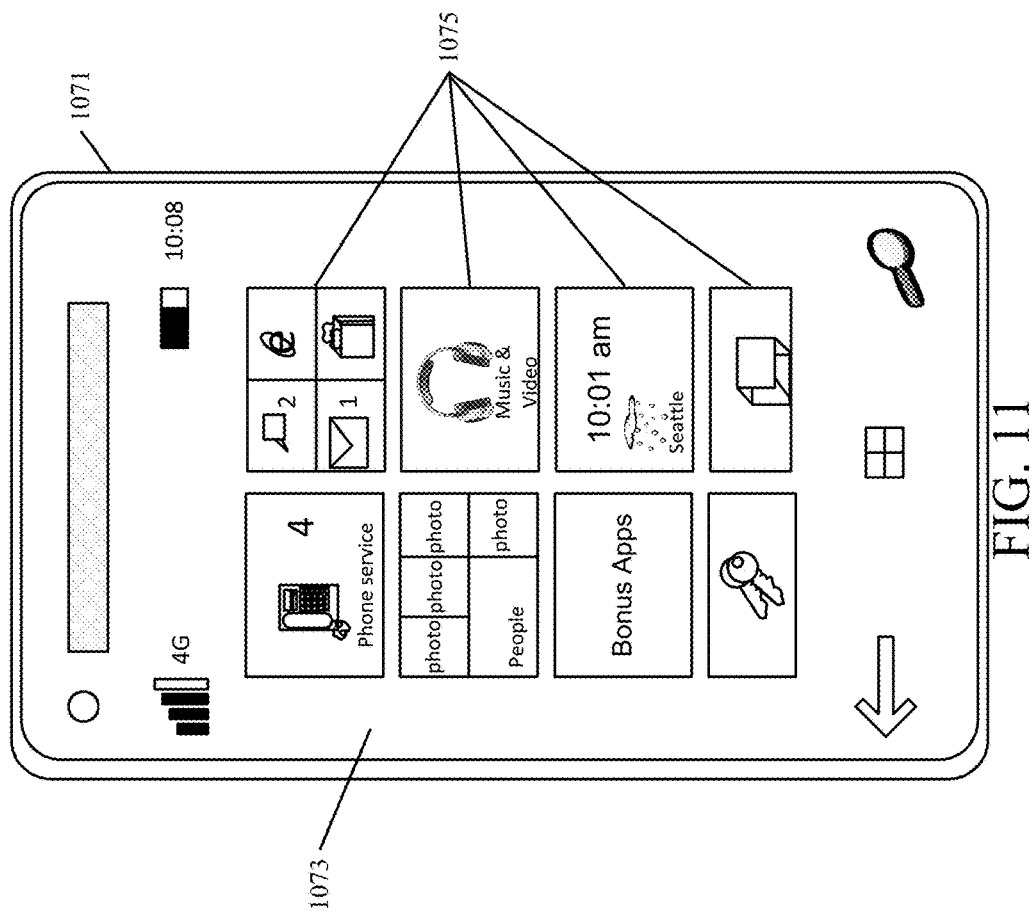

FIG. 9 is a simplified block diagram of one illustrative example of a handheld or mobile computing device that can be used as a user's or client's handheld device 916, in which the present system (or parts of it) can be deployed. For instance, a mobile device can be deployed in the operator component of an agricultural machine, for example machines 300, 500, for use in generating, processing or displaying the data. FIGS. 10-11 are examples of handheld or mobile field devices.

FIG. 9 provides a general block diagram of a client device 916 that can run some components shown in previous figures, that interacts with them, or both. In the device 916, a communications link 913 is provided that allows the handheld device to communicate with other computing devices and under some embodiments provide a channel for receiving information automatically, such as by scanning. Examples of communication link 913 include allowing communication through one or more communication protocols, such as wireless services used to provide cellular access to a network, as well as protocols that provide local wireless connection to networks.

In other examples, applications can be received on a removable secure disc (SD card) that is connected at an interface 915. Interface 915 and communication links 913 communicate with a processor 917 (which can embody processors or servers from previous figures) along a bus 919 that is connected to memory 921 and input/output (I/O) component 923 as well as clock 925 and location system 927.

I/O components 923 in one embodiment are provided to facilitate input and output operations. I/O components 923 for various embodiments of the device 916 can include input components such as buttons, touch screens, optical sensors, microphones, touch sensors, proximity sensors, accelerometers, orientation sensors and output sensors such as a display device, a speaker, and/or a printer port. Other I/O components 923 can be used as well.

Clock 925 illustratively comprises a real time clock component that outputs a time and date. It can also, illustratively provide timing functions for processors 917.

Location system 927 illustratively includes a component that outputs a current geographical location of 916. This can include, for instance, a global position system (GPS) receiver, a LORAN system, a dead reckoning system, a cellular triangulation system, or other positioning system. It can also include, for example, mapping software and navigation software that generates desired maps, navigation routes and other geographic functions.

Memory 921 stores operating system 929, network settings 931, applications 933, (which can include application configuration settings 935 and contact or phone book applications 943) data store 937, communication drivers 939, and communication configuration settings 941. It can include a client system 924 that is a client component of another system that operates remotely. Memory 921 can include all types of tangible volatile and non-volatile computer readable memory devices. It can also include computer storage media (described below). Memory 921 stores computer readable instructions that, when executed by processor 917, cause the processor to perform computer implemented steps or functions according to the instructions. Processor 917 can be activated by other components to facilitate their functionality as well.

FIG. 10 shows one example in which device 916 is a tablet computer 1000. In FIG. 10, computer 1000 is shown with user interface display screen 1002. Screen 1002 can be a touch screen or pen-enabled interface that receives input from a pen or stylus. It can also use an on-screen virtual keyboard. Of course, it might also be attached to a keyboard or other user input device through a suitable attachment mechanism, such as a wireless link or USB port, for instance. Computer 1000 can also illustratively receive voice inputs as well.

FIG. 11 shows that the device is a smartphone 1071. Smartphone 1071 has a touch sensitive display 1073 that displays icons or tiles or other user input mechanisms 1075. Mechanisms 1075 can be used by a user to run applications, make calls, perform data transfer operations, etc. In general, smartphone 1071 is built on a mobile operating system and offers more advanced computing capability and connectivity than a feature phone.

Note that other forms of device 916 are possible.

Figure 12:
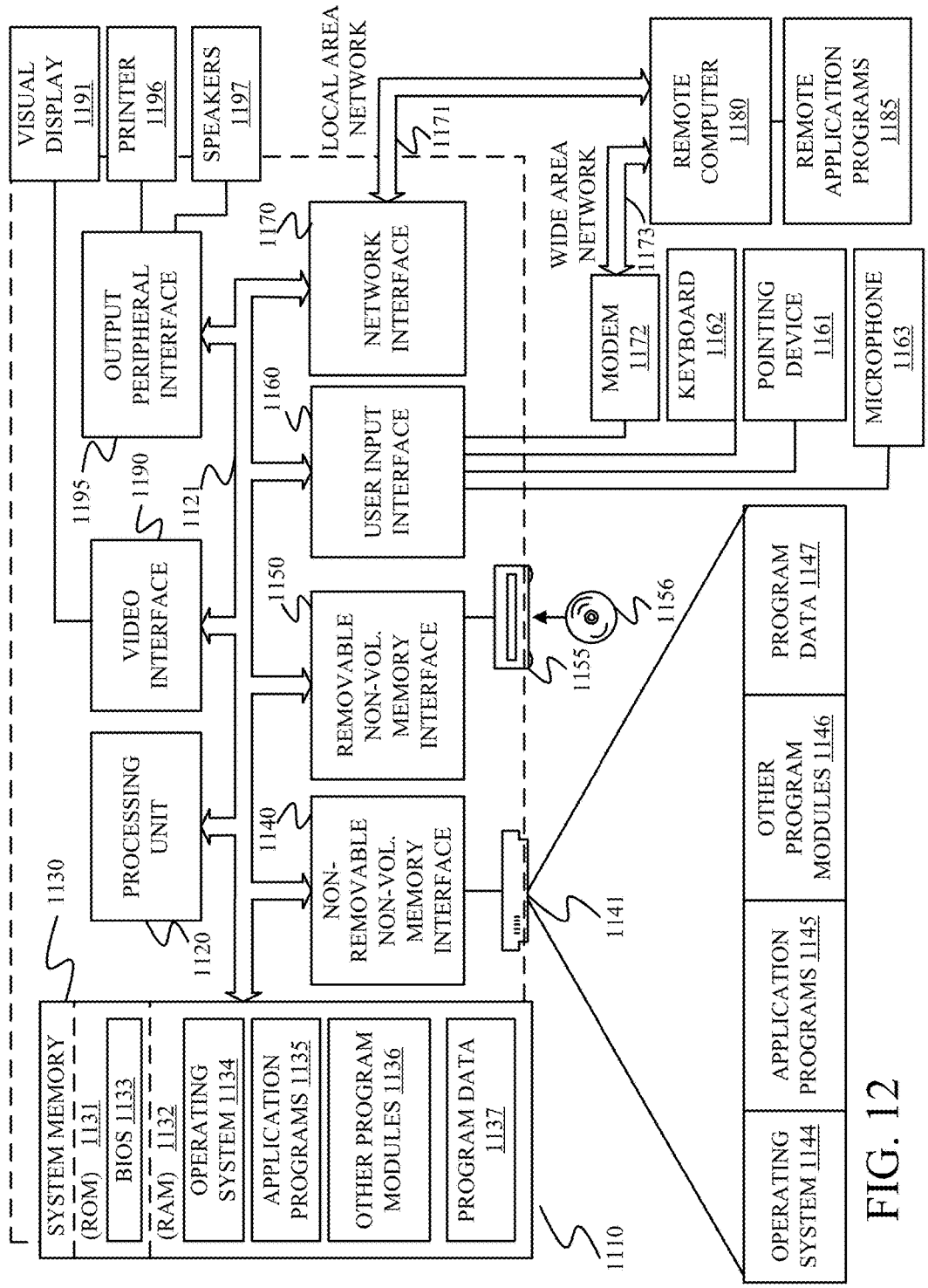
FIG. 12 shows an example of a computing environment that can be used in the architectures shown in previous figures.

FIG. 12 is one example of a computing device in which elements of the previous figures or parts of them, can be deployed. With reference to FIG. 12, an example system for implementing some embodiments includes a general purpose computing device in the form of a computer 1110. Components of computer 1110 may include, but are not limited to, processing unit 1120 (which can comprise processors or servers from previous figures), a system memory 1130, a system bus 1121 that couples various system components including the system memory to the processing unit 1120. The system bus 1121 may be any of several types of bus structures including a memory bus or memory controller, peripheral bus, and a location bus using any of a variety of bus architectures. Memory in programs described with respect to previous figures can be deployed in corresponding portions of FIG. 12.

Computer 1110 typically includes a variety of computer readable media. Computer readable media can be any available media that can be accessible by computer 1110 and includes both volatile and non-volatile memory, removable and non-removable media. By way of example, not limitation, computer removable media may comprise computer storage media and communication media. Computer storage media is different from, and does not include, a modulated data signal or carrier wave. It includes hardware storage media including both volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD/ROM, digital versatile discs (DVD) or other optical disc storage, magnetic cassettes, magnetic tape, magnetic disc storage or other magnetic storage devices or other medium which can be used to store the desired information and which can be accessed by computer 1110. Communication media may embody computer readable instructions, data structures, program modules or other data in a transport mechanism and includes any information delivery media. The term "modulated data signal" means a signal that has one or more of its characteristics set or changed in a manner as to encode information in the signal.

The system memory 1130 includes computer storage media in the form of volatile and/or non-volatile memory such as read-only memory (ROM) 1131 and random access memory (RAM) 1132. A basic input/output system 1133 (BIOS), containing the basic routines that help to transfer information between elements within computer 1110 such as during startup, as typically stored in ROM 1131. Ram 1132 typically contains data and/or program modules that are immediately accessible to and/or presently being operated on by processing unit 1120. By way of example and not limitation, FIG. 12 illustrates operating system 1134, application programs 1135, other program modules 1136, and program data 1137.

The computer 1110 may also include other removable/non-removable, volatile/non-volatile computer storage media. By way of example only, FIG. 12 illustrates a hard disc drive 1141 that reads from or writes to non-removable, non-magnetic media, an optical disc drive 1135, and non-volatile optical disc 1156. The hard disc drive 1141 may be connected to the system bus 1121 through a non-removable memory interface such as interface 1140, an optical disc drive 1155 as typically connected to the system bus 1121 by a removable memory interface such as interface 1150.

Alternatively, or in addition, the functionality described herein can be performed, at least in part, by one or more hardware logic components. For example, and without limitation illustrative types of hardware logic components that can be used include field programmable gate arrays (FPGAs), application-specific integrated circuits (e.g., ASCIs), application specific standard products (e.g., ASSPs), system on a chip systems (SOCs), complex programmable logic devices (CPLDs), etc.

The drives in their associated computer storage media discussed above and illustrated in FIG. 12 provide storage of computer readable instructions, data structures, program modules, and other data for the computer 1110. In FIG. 12, for example, hard disc drive 1141 is illustrated as storing operating system 1144, application programs 1145, other program data 1147. Notes that these components can be either the same or different from operating system 1134, application program 1135, other program modules 1136, and program data 1137.

A user may enter commands and information into the computer 1110 through input devices such as keyboard 1162, a microphone 1163, and a pointing device 1161, such as a mouse, trackball or touchpad. Other input devices (not shown) may include a joystick, game pad, satellite dish, scanner or the like. These and other input devices are often connected to the processing unit 1120 through a user input interface 1160 that is coupled to the system bus, but may be connected by other interfaces and bus structures. A visual display 1191 or other type of display device is also connected to the system bus 1121 via an interface, such as a video interface 1190. In addition to the monitor, computers may also include other peripheral output devices such as speakers 1197 and printers 1196 which may be connected through output peripheral interface 1195. The computer 1110 is operated in a networked environment using logical connections (such as local area network-LAN, or wide area network-WAN) to one or more remote computers, such as remote computer 1180.

When used in an LAN networking environment, the computer 1110 is connected to the LAN 1171 through a network interface or adapter 870. When used in a WAN networking environment, the computer 1110 typically includes a model 1172 or other means for establishing connection over the WAN 1173, such as the Internet. In a networked environment, program modules may be stored in a remote memory storage device. FIG. 12 illustrates, for example, that remote application programs 1185 can reside on remote computer 1180.

It should also be noted that the different embodiments described herein can be combined in different ways. That is, parts of one or more embodiments can be combined with parts of one or more other embodiments. All of this is contemplated herein.

Example 1 is a mobile machine comprising:
a controllable subsystem; and
a controller configured to receive a first data set and a second data set, wherein the first and second data sets comprise indications of a soil parameter of a worksite, and wherein the first data set is captured at an earlier time than the second data set map greater logic and, based on the first and second data sets, generate a map of the worksite and further configured to generate a control signal based on both a position of the agricultural machine within the worksite and the generated map, the control signal controlling application of the controllable subsystem.

Example 2 is the mobile machine of any or all previous examples, and further comprising a sensor sensing, as the soil parameter, show depth at various locations on the worksite.

Example 3 is the mobile machine of any or all previous examples, wherein the controller is configured to estimate soil moisture based on the snow depth indicated by the first and second data sets.

Example 4 is the mobile machine of any or all previous examples, wherein the controllable subsystem comprises a ground engaging implement and wherein the control signal controls a depth of engagement of the ground engaging implement based on the estimated soil moisture.

Example 5 is the mobile machine of any or all previous examples wherein the first and second data sets are sensed by an image capture component on an unmanned aerial vehicle (UAV) and further comprising:
a communication component configured to receive the first and second data set from the UAV.

Example 6 is the mobile machine of any or all previous examples, wherein the controllable subsystem comprises:
a depth control system on a planting machine that controls a planting depth.

Example 7 is the mobile machine of any or all previous examples, wherein the controllable subsystem comprises a chemical applicator, and wherein the control signal comprises an application rate control system that controls an application rate for the chemical applicator.

Example 8 is the mobile machine of any or all previous examples, wherein the soil parameter is soil temperature, and wherein the map generator logic generates the map as a soil temperature map of the worksite.

Example 9 is the mobile machine of any or all previous examples, wherein the map generator logic generates the map by accessing a priori knowledge about the worksite to the first and second data sets.

Example 10 is the mobile machine of any or all previous examples, wherein the image capture component comprises a camera, and the first and second data sets comprise image data corresponding to the worksite.

Example 11 is the mobile machine of any or all previous examples, wherein the controller is configured to generate a third data set, wherein the third data set is an estimated future soil parameter value, the controller generating the control signal based on the estimated future soil parameter value.

Example 12 is a method of adjusting a controllable subsystem on a mobile vehicle comprising:
receiving a first image of a worksite, captured at a first time;
receiving a second image of a worksite, captured at a second time, wherein the second time is different from the first time;
generating, using a processor, a differential soil parameter map of the worksite, wherein the differential soil parameter map is generated by combining the first and second images and deriving soil parameter information for the worksite;
generating a prescription for controlling a controllable subsystem, based on the differential map, wherein the prescription prescribes operation of the controllable subsystem within the worksite; and generating a control signal based on the prescription and based on a location of the mobile machine in the worksite.

Example 13 is the method of any or all previous examples, and further comprising:

identifying a change in snow depth at the worksite based on the first and second images.

Example 14 is the method of any or all previous examples, wherein generating a differential soil parameter map comprises:

estimating a soil moisture based on the identified change in snow depth; and generating a soil moisture map for the worksite based on the estimated soil moisture.

Example 15 is the method of any or all previous examples, wherein the controllable subsystem comprises a depth control mechanism on a soil engaging implement and wherein generating the control signal comprises:

generating the control signal to control the depth control mechanism.

Example 16 is the method of any or all previous examples, and further comprising:

identifying a soil temperature at the worksite, wherein generating the prescription comprises generating the prescription for controlling the controllable subsystem based on the identified soil temperature.

Example 17 is the method of any or all previous examples, wherein the controllable subsystem comprises a chemical applicator, and generating the control signal comprises:

generating the control signal to control an application rate for the chemical applicator.

Example 18 is a method for generating a route for a mobile vehicle through a worksite, the method comprising:

receiving a georeferenced indication of a soil moisture content for the worksite;

receiving a route specification corresponding to the mobile vehicle, wherein the route specification comprises a start point and an endpoint;

generating the route based on the georeferenced indication of the soil moisture content and the route specification;

controlling the mobile vehicle to navigate through the worksite based on the generated route.

Example 19 is the method of any or all previous examples and further comprising:

determining whether the generated route is an available for mobile vehicle; and if not, surfacing a user notification that the generated route is unavailable.

Example 20 is the method of any or all previous examples wherein surfacing comprises:

identifying suggested modifications to the route specification; and prompting the user to modify the route specification using the suggested modifications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A mobile machine comprising:

map generator logic configured to receive a first data set and a second data set, wherein the first and second data sets comprise indications of a soil parameter of a worksite, wherein the soil parameter comprises soil temperature, and wherein the first data set is captured at an earlier time than the second data set and, based on the first and second data sets, generate a soil temperature map of the worksite;

a controllable subsystem;

a controller configured to generate a control signal based on both a position of the agricultural machine within the worksite and the generated soil temperature map; and a control system configured to control the controllable subsystem based on the control signal.

2. The mobile machine of claim 1, and further comprising:

a sensor sensing, as the soil parameter, snow depth at various locations on the worksite.

3. The mobile machine of claim 2, wherein the controller is configured to estimate soil moisture based on the snow depth indicated by the first and second data sets.

4. The mobile machine of claim 3, wherein the controllable subsystem comprises a ground engaging implement and wherein the control signal controls a depth of engagement of the ground engaging implement based on the estimated soil moisture.

5. The mobile machine of claim 4, wherein the first and second data sets are sensed by an image capture component on an unmanned aerial vehicle (UAV) and further comprising:

a communication component configured to receive the first and second data sets from the UAV.

6. The mobile machine of claim 5, wherein the image capture component comprises a camera, and the first and second data sets comprise image data, captured by the camera, corresponding to the worksite.

7. The mobile machine of claim 6, wherein the controller is configured to generate a third data set, wherein the third data set is an estimated future soil parameter value, the controller generating the control signal based on the estimated future soil parameter value.

8. The mobile machine of claim 4, wherein the controllable subsystem comprises:

a depth control system on a planting machine that controls a planting depth.

9. The mobile machine of claim 3, wherein the controllable subsystem comprises a chemical applicator, and wherein the control signal comprises an application rate control system that controls an application rate for the chemical applicator.

10. The mobile machine of claim 1, wherein the map generator logic generates the soil temperature map by accessing a priori knowledge about the worksite to generate the soil parameter from the first and second data sets.

11. A method of adjusting a controllable subsystem on a mobile vehicle comprising:

receiving a first image of a worksite, captured at a first time;

receiving a second image of the worksite, captured at a second time, wherein the second time is different from the first time;

generating, using a processor, a differential soil parameter map of the worksite, wherein the differential soil parameter map is generated by analyzing the first and second images and deriving soil parameter information for the worksite;

generating a prescription for controlling a controllable subsystem, based on the differential map, wherein the prescription prescribes operation of the controllable subsystem within the worksite;

generating a control signal based on the prescription and based on a location of the mobile machine in the worksite; and controlling the controllable subsystem based on the control signal.

12. The method of claim 11, and further comprising:

identifying a soil temperature at the worksite, wherein generating the prescription comprises generating the prescription for controlling the controllable subsystem based on the identified soil temperature.

13. The method of claim 11, and further comprising:

identifying a change in snow depth at the worksite based on the first and second images.

14. The method of claim 13, wherein generating a differential soil parameter map comprises:

estimating a soil moisture based on the identified change in snow depth; and generating a soil moisture map for the worksite based on the estimated soil moisture.

15. The method of claim 14, wherein the controllable subsystem comprises a depth control mechanism on a soil engaging implement and wherein generating the control signal comprises:

generating the control signal to control the depth control mechanism.

16. The method of claim 13, wherein the controllable subsystem comprises a chemical applicator, and generating the control signal comprises:

generating the control signal to control an application rate for the chemical applicator.

17. A method for generating a route for a mobile vehicle through a worksite, the method comprising:

receiving a geo-referenced indication of a soil moisture content for the worksite;

receiving a route specification corresponding to the mobile vehicle, wherein the route specification comprises a start point and an endpoint;

identifying suitable route information based on the geo-referenced indication of soil moisture content and a machine parameter indicative of a machine characteristic that affects an ability of the mobile vehicle to traverse soil based on soil moisture;

generating the route based on the suitable route information and the route specification; and controlling the mobile vehicle to navigate through the worksite based on the generated route.

18. The method of claim 17, wherein surfacing a user notification comprises:

identifying suggested modifications to the route specification; and prompting the user to modify the route specification using the suggested modifications.

* * * * *